United States Patent
Yokoyama et al.

(10) Patent No.: US 8,741,245 B2
(45) Date of Patent: Jun. 3, 2014

(54) CARBON DIOXIDE-ABSORBING SOLUTION AND METHOD OF RECOVERING CARBON DIOXIDE

(75) Inventors: Koichi Yokoyama, Kure (JP); Eiji Miyamoto, Kure (JP); Hirofumi Kikkawa, Kure (JP); Shigehito Takamoto, Kure (JP); Toshio Katsube, Kure (JP); Naoki Oda, Kure (JP); Jun Shimamura, Kure (JP); Masaharu Kuramoto, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 49 days.

(21) Appl. No.: 13/519,264

(22) PCT Filed: Dec. 28, 2009

(86) PCT No.: PCT/JP2009/071806
§ 371 (c)(1),
(2), (4) Date: Aug. 14, 2012

(87) PCT Pub. No.: WO2011/080838
PCT Pub. Date: Jul. 7, 2011

(65) Prior Publication Data
US 2012/0308469 A1    Dec. 6, 2012

(51) Int. Cl.
*B01D 53/62*    (2006.01)

(52) U.S. Cl.
USPC ........ 423/220; 423/228; 423/437.1; 252/184; 252/189; 252/190; 252/183.12

(58) Field of Classification Search
USPC ............... 423/220, 228, 437.1; 252/184, 189, 252/190, 183.12
See application file for complete search history.

(56) References Cited

U.S. PATENT DOCUMENTS

| | | | |
|---|---|---|---|
| 4,313,917 A * | 2/1982 | Ohta | 423/228 |
| 2011/0079151 A1* | 4/2011 | Ohashi et al. | 96/242 |
| 2012/0308469 A1* | 12/2012 | Yokoyama et al. | 423/437.1 |
| 2013/0052109 A1* | 2/2013 | Davis et al. | 423/220 |

FOREIGN PATENT DOCUMENTS

| | | |
|---|---|---|
| JP | 2871334 | 11/1993 |
| JP | 3529855 | 4/1996 |
| JP | 09-000875 | 1/1997 |
| JP | 3739437 | 1/1997 |
| JP | 2005-254233 | 9/2005 |
| JP | 2008-168227 | 7/2008 |

OTHER PUBLICATIONS

International Search Report of International Application No. PCT/JP2009/071806 dated Feb. 9, 2010.

* cited by examiner

*Primary Examiner* — Timothy Vanoy
(74) *Attorney, Agent, or Firm* — Fay Sharpe LLP

(57) ABSTRACT

A method of recovering carbon dioxide, includes bringing gas to be processed containing carbon dioxide ($CO_2$) and oxygen into contact with the $CO_2$-absorbing solution in an absorption column to form a $CO_2$-rich solution; circulating the solution in a regeneration column to thermally release and recover $CO_2$ and recirculating the absorbing solution as a $CO_2$-poor solution inside the absorption column; and performing heat exchange between the solution being delivered from the absorption column to the regeneration column and the solution recirculated from the regeneration column to the absorption column, wherein an alkanolamine aqueous solution containing a silicone oil and/or an organosulfur compound is added to the solution inside the absorption column and/or the solution recirculated from the regeneration column to the absorption column to adjust the composition of the absorbing solution inside the absorption column.

6 Claims, 1 Drawing Sheet

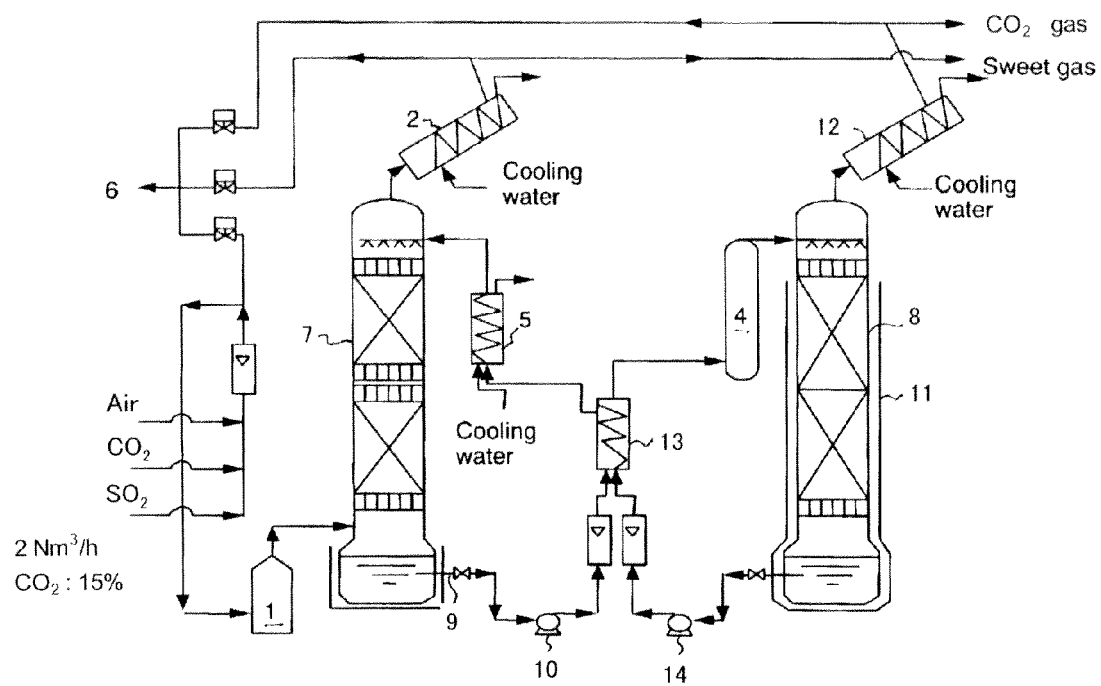

CARBON DIOXIDE-ABSORBING SOLUTION AND METHOD OF RECOVERING CARBON DIOXIDE

TECHNICAL FIELD

The present invention relates to a carbon dioxide-absorbing solution and a method of recovering carbon dioxide using the solution, more specifically, relates to a carbon dioxide-absorbing solution for stably recovering carbon dioxide for a long time from exhaust gas discharged by combustion equipment such as a boiler, and relates to a method of recovering carbon dioxide.

BACKGROUND ART

In thermal power plants, for example, carbon dioxide (hereinafter, referred to as $CO_2$) is produced with combustion of fossil fuels such as coal to increase the $CO_2$ concentration in the atmosphere. It has been said that this is accompanied by an increase in temperature which causes various environmental issues. Since Kyoto Protocol has been adopted at Kyoto Conference of Parties to the Framework Convention on Climate Change (COP3) in December, 1997 in order to prevent global warming, countermeasures for reducing the amount of $CO_2$ emission have been conducted in each country. Among methods recovering $CO_2$ from combustion exhaust gas containing oxygen ($O_2$) and sulfur oxides ($SO_X$) discharged from thermal power plants, etc., absorption by an alkanolamine solution is most likely to be put into practical use at present (Patent Literature 1). Regarding this method, types of alkanolamines suitable for $CO_2$ recovery (e.g., Patent Literature 2) and conditions for applying the method to exhaust gas containing sulfur oxides (e.g., Patent Literature 1) have been studied. These alkanolamines are harder to be oxidized with oxygen contained in combustion exhaust gas than conventionally used monoethanolamine, however, in light of long period of use longer than several thousand hours, a problem of replacement amounts of these solutions due to oxidative degradation occurs. Against this problem, oxidation of an alkanolamine in the absorbing solution can be considerably inhibited by adding to the solution an organosulfur compound, such as a mercaptoimidazole or a mercaptobenzimidazole, as an oxidation inhibitor for the alkanolamine (e.g., Patent Literature 3).

In a method of recovering $CO_2$ contained in combustion exhaust gas from a boiler, $CO_2$ is recovered by bringing the gas to be processed containing $CO_2$ into contact with an absorbing solution of an alkanolamine inside an absorption column to give a $CO_2$-rich solution and subsequently circulating the solution in a regeneration column to thermally release $CO_2$ (e.g., Patent Literature 1).

PRIOR ART LIST

Patent Literatures

Patent Literature 1: JP 3529855 B
Patent Literature 2: JP 2871334 B
Patent Literature 3: JP 3739437 B

SUMMARY OF THE INVENTION

Problems to be Resolved by the Invention

In the method of recovering carbon dioxide described above, though the alkanolamine in the absorbing solution is partially oxidized and decomposed by oxidation components in combustion exhaust gas, such as $O_2$ and NOx, in particular oxygen, the oxidative decomposition of the alkanolamine can be inhibited by adding the organosulfur compound to the absorbing solution. However, it has been revealed that the effect of the oxidation inhibitor is not sufficiently shown under some conditions of operating the absorption column.

That is, the present inventors have found that in the absorption column, the following phenomenon causes oxidation of the oxidation inhibitor in the absorbing solution to reduce the concentration of the oxidation inhibitor and thereby the alkanolamine tends to be oxidized. That is, it has been revealed that in the absorption column, in order to increase the area where the absorbing solution and combustion exhaust gas come into contact with each other as much as possible for increasing the amount of $CO_2$ to be recovered, the exhaust gas is brought into contact with the absorbing solution in a packed bed including a filler having a high specific surface area. Accordingly, when the absorbing solution and the combustion exhaust gas pass through a relatively narrow flow channel, bubbles are readily formed, and when the bubbles burst, particles of which sedimentation velocity is less than the gas flow rate scatter together with the gas. Since the scattered particulate absorbing solution (absorbing solution mist) comes into contact with the air with a specific area larger than that of the bulk absorbing solution, the oxidation inhibitor in the absorbing solution is oxidized to reduce the concentration thereof in the solution and, as a result, the alkanolamine in the absorbing solution mist is readily oxidized.

In order to prevent this phenomenon, an increase in concentration of the oxidation inhibitor is one countermeasure. In the case of an oxidation inhibitor having low solubility in water, such as organosulfur compounds, however, the addition amount thereof has a limitation. In addition, the countermeasure has a problem of increasing the consumption of the oxidation inhibitor.

It is an object of the present invention to provide a method of absorbing $CO_2$ without increasing the concentration of an oxidation inhibitor in a $CO_2$ absorbing solution containing an alkanolamine by inhibiting oxidation of the oxidation inhibitor in the absorbing solution to reduce the amounts of the alkanolamine and the oxidation inhibitor scattering from an absorption column due to oxidative decomposition thereof and to thereby reduce the replacement amounts thereof.

Means for Solving the Problems

In order to solve the above-described problems, the invention claimed in the present application is as follows.
(1) A carbon dioxide-absorbing solution capable of absorbing carbon dioxide from gas to be processed containing carbon dioxide and oxygen and releasing carbon dioxide, wherein the absorbing solution is an aqueous solution containing an alkanolamine represented by $C_nH_{2n+1}NHC_{n'}H_{2n'+1}O$, wherein n represents an integer of 0 to 4 and n' represents an integer of 1 to 3; one or more organosulfur compounds selected from the group consisting of mercaptoimidazoles represented by the following Formula (A) and mercaptobenzimidazoles represented by the following Formula (B); and a silicone oil, wherein the aqueous solution contains the alkanolamine in an amount of 30% by weight or more and 60% by weight or less, the organosulfur compounds in an amount of 0.01% by weight or more and 2% by weight or less, and the silicone oil in an amount of 5 ppm by weight or more and 100 ppm by weight or less,

[Formula 1]

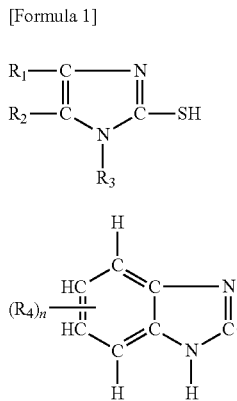

In the formulae, $R_1$, $R_2$, and $R_3$ represent hydrogen atoms, $C_1$ to $C_3$ alkyl groups, phenyl groups, or benzyl groups; $R_4$ represents a hydrogen atom or a $C_1$ to $C_3$ alkyl group; and n represents an integer of 1 to 3.

(2) The carbon dioxide-absorbing solution according to aspect (1), wherein the alkanolamine is one or more compounds selected from the group consisting of 2-aminoethanol, 2-(methylamino)ethanol, 2-(ethylamino)ethanol, 2-amino-2-methyl-1-propanol, and 2-(isopropylamino)ethanol.

(3) A method of recovering carbon dioxide, wherein the method comprises: bringing gas to be processed containing carbon dioxide ($CO_2$) and oxygen into contact with a $CO_2$-absorbing solution according to claim 1 in an absorption column to form a $CO_2$-rich solution; subsequently circulating the solution in a regeneration column to thermally release and recover $CO_2$ and recirculating the absorbing solution as a $CO_2$-poor solution inside the absorption column; and performing heat exchange between the solution being delivered from the absorption column to the regeneration column and the solution recirculated from the regeneration column to the absorption column, wherein an alkanolamine aqueous solution containing a silicone oil and/or an organosulfur compound represented by Formula (A) or (B) shown above is added to the solution inside the absorption column and/or the solution recirculated from the regeneration column to the absorption column to adjust the composition of the absorbing solution inside the absorption column so as to include the alkanolamine in an amount of 30% by weight or more and 60% by weight or less, the organosulfur compound in an amount of 0.01% by weight or more and 2% by weight or less, and the silicone oil in an amount of 5 ppm by weight or more and 100 ppm by weight or less.

(4) The method of recovering carbon dioxide according to aspect (3), wherein the alkanolamine is one or more compounds selected from the group consisting of 2-aminoethanol, 2-(methylamino)ethanol, 2-(ethylamino)ethanol, 2-amino-2-methyl-1-propanol, and 2-(isopropylamino)ethanol.

(5) The method of recovering carbon dioxide according to aspect (3) or (4), wherein the alkanolamine aqueous solution containing the organosulfur compound represented by the Formula (A) or (B) has an alkanolamine concentration higher than that in the absorbing solution and an organosulfur compound concentration higher than that in the absorbing solution.

Advantageous Effects of the Invention

According to the $CO_2$ absorbing solution and the method of recovering $CO_2$ of the present invention, oxidative decomposition of the alkanolamine and the oxidation inhibitor contained in the absorbing solution can be inhibited. As a result, the scattering amounts due to oxidative decomposition of the alkanolamine and the oxidation inhibitor in the absorbing solution during operating can be decreased, and thereby the replacement amounts thereof can be reduced.

BRIEF DESCRIPTION OF THE DRAWING

FIG. 1 is a system diagram of an experimental apparatus used in Examples of the present invention.

EXPLANATION OF SYMBOLS

1: humidifier, 2: cooler, 3: heat exchanger, 4: preheater, 5: amine cooler, 6: gas monitor, 7: absorption column, 8: regeneration column

EMBODIMENTS FOR CARRYING OUT THE INVENTION

In the $CO_2$-absorbing solution of the present invention, an alkanolamine represented by $C_nH_{2n+1}NHC_{n'}H_{2n'+1}O$, wherein n represents an integer of 0 to 4 and n' represents an integer 1 to 3, in particular, one of or a mixture of 2-aminoethanol (hereinafter, also referred to as MEA, molecular weight: 61.08), 2-methylaminoethanol (hereinafter, also referred to as MAE, molecular weight: 75.12), 2-ethylaminoethanol (hereinafter, also referred to as EMEA, molecular weight: 89.14), 2-amino-2-methyl-1-propanol (hereinafter, also referred to as AMP, molecular weight: 89.14), and 2-isopropylaminoethanol (hereinafter, also referred to as IPAE, molecular weight: 103.16) is preferred from the viewpoints of a high $CO_2$-absorbing rate and low heat of dissociation of absorbed $CO_2$.

The concentration of alkanolamine in the $CO_2$-absorbing solution is 35 to 60% by weight and varies depending on the apparatus. In an absorption column usually using an aqueous solution of 30% by weight of MEA (e.g., Example in JP 5-87290 B), if the alkanolamine is used under conditions equivalent to those in the case of using the MEA aqueous solution, the alkanolamine concentration may be adjusted to, for example, 44% by weight in the case of the EMEA or the AMP, 51% by weight in the case of the IPAE; and 22% by weight of the EMEA and 25% by weight of the IPAE in the case of using both the EMEA and the IPAE at the same molar concentrations, in the light of the molar concentration of the amine. A reduction in concentration of the alkanolamine decreases the viscosity and has an advantage of preventing flooding at the packed bed in the absorption column. However, since the reduction in concentration decreases the $CO_2$-absorbing volume per unit value of the solution, disadvantageously, the $CO_2$-absorbing ability in the absorption column; and the heat quantity supplied during $CO_2$ recovery inside the regeneration column increases.

Various examples of the silicone oil in the $CO_2$-absorbing solution of the present invention include a hydrophilic oil type, a solvent type where a solvent is added to silicone, an emulsion type, a powder type, and a self-emulsification type. In particular, the emulsion type, the hydrophilic oil type, and self-emulsification type are preferred. In addition, in the light of heating in the regeneration column while the emulsion state being maintained even after addition of an alkali aqueous solution, the silicone oil having a certain level of heat resistance is desirable. As the silicone oil satisfying such properties, for example, KS604, KS537, and KS538 manufactured by Shin-Etsu Chemical Co., Ltd. and FS544 manufactured by Dow Corning Toray Co., Ltd. can be used. Note that a silicone oil forming granular precipitate enhances foaming of an amine solution in some cases and is therefore undesirable.

The concentration of the silicone oil is in the range of 5 to 100 ppm, preferably 10 to 50 ppm. A silicone oil concentration of less than 5 ppm may not sufficiently prevent generation of absorbing solution mist. In contrast, though a concentration of higher than 100 ppm can sufficiently prevent generation of absorbing solution mist, the silicone oil may cover the surface layer of the absorbing solution to inhibit the reaction of absorbing $CO_2$.

Examples of the mercaptoimidazole as the organosulfur compound represented by Formula (A) include 2-mercaptoimidazole, 2-mercapto-1-methylimidazole, 2-mercapto-4-methylimidazole, 2-mercapto-5-methylimidazole, 2-mercapto-1,4-dimethylimidazole, 2-mercapto-1,5-dimethylimidazole, 2-mercapto-1-phenylimidazole, 2-mercapto-4-phenylimidazole, and 2-mercapto-1-benzylimidazole. Examples of the mercaptobenzimidazole represented by Formula (B) include 2-mercaptobenzimidazole, 4-methyl-2-mercaptobenzimidazole, and 5-methyl-2-mercaptobenzimidazole.

The concentration of the organosulfur compound in the $CO_2$-absorbing solution is 0.01 to 2% by weight, preferably 0.1 to 1% by weight. In a concentration of less than 0.01% by weight, the oxidation-inhibiting effect is low, and such a concentration is impractical. A concentration of higher than 2% by weight is near the saturation solubility and may precipitate the organosulfur compound by influence of trace components in the exhaust gas.

In addition, the present inventors have found that the organosulfur compound can be dissolved in an alkanolamine. That is, an aqueous solution containing an alkanolamine at a concentration higher than that in an absorbing solution can dissolve a larger amount of an organosulfur compound than the absorbing solution. Accordingly, the concentration of a sulfur compound in the absorbing solution can be controlled by feeding an alkanolamine aqueous solution containing an organosulfur compound at a high concentration.

In the region where the combustion exhaust gas and the absorbing solution in the absorption column come into contact with each other, the organosulfur compound and the silicone oil are required to be contained at certain concentrations for preventing generation of absorbing solution mist. In particular, the absorbing solution is heated in the regeneration column, and thereby the silicone oil tends to deteriorate and the effect thereof tends to decline compared with the organosulfur compound. Consequently, it is important to maintain the concentration of the silicone oil contained in the absorbing solution inside the absorption column within a certain range. Accordingly, it is preferable to add an alkanolamine aqueous solution containing the silicone oil and/or the organosulfur compound to the absorbing solution to be recirculated from the regeneration column to the absorption column or to the absorbing solution inside the absorption column and thereby to control the concentrations of the silicone oil and the organosulfur compound in the absorption column in certain levels. When a $CO_2$-recovery apparatus is started, an alkanolamine aqueous solution only or an alkanolamine aqueous solution containing a silicone oil or an organosulfur compound is charged in the absorption column, and then the absorbing solution of the present invention containing additives at predetermined concentrations may be added thereto.

FIG. 1 is an explanatory view of a $CO_2$-absorbing apparatus illustrating an example of the present invention. This apparatus is mainly composed of a $CO_2$ absorption column 7 for allowing gas-liquid contact between gas to be processed and a $CO_2$ absorbing solution, and a regeneration column 8 for heating the $CO_2$-rich absorbing solution that absorbed $CO_2$ in the absorption column 7 to separate and recover $CO_2$ and thereby regenerating the absorbing solution. Simulated combustion exhaust gas containing $O_2$ and $N_2$ as well as $CO_2$ passes through a humidifier 1 and is supplied to the absorption column 7. The gas ascends in the absorption column 7 and comes into contact with an absorbing solution descending from the top of the column, and $CO_2$ in the gas is absorbed in the solution. The mist in the exhaust gas is captured in a cooling water unit disposed on the top of the column. The gas is then led to a gas outlet line and passes through a cooler 2 and is then vented to the air. A part of the exhaust gas is sent to a gas monitor 6 for analysis. The absorbing solution containing a large amount of $CO_2$ (rich absorbing solution) is discharged from the absorption column 7 through a liquid outlet line 9 at the bottom of the column, passes through a pump 10, is led to a heat exchanger 13, and is further heated by a preheater 4. The rich absorbing solution is sent to the regeneration column 8 of which outer wall 11 is heated with a heater and releases $CO_2$ therein. The released $CO_2$ passes through an outlet line at the top of the regeneration column 8 and then through a condenser 12 and is vented to the atmosphere. In this step, the condensate (lean absorbing solution) returns to the regeneration column 8, descends in the regeneration column, passes through the bottom of the regeneration column, is sent to the heat exchanger 13 by a pump 14, is cooled by the heat exchange with the rich absorbing solution, further passes through an amine cooler 5, and is recirculated into the absorption column 7.

The absorption column 7 and the regeneration column 8 used in this example both had a column diameter of 50 mm and a packed bed height of a filler of 1.4 m. As the silicone oil, KS604, KS537, or KS538 manufactured by Shin-Etsu Chemical Co., Ltd. or FS544 manufactured by Dow Corning Toray Co., Ltd. was used, but the present invention is not limited thereto.

Main experimental conditions were that the absorption column inlet gas temperature and the solution temperature were 30° C., the regeneration column inlet solution temperature was 100° C., the regeneration column solution temperature was 110° C. at the highest, the cooler temperature was 30° C., the gas flow rate was 2 m³/h, and the liquid-gas ratio was 3.0 (L/m³).

In this example, as the alkanolamine, 2-ethylaminoethanol (EMEA), 2-aminoethanol (MEA), or 2-isopropylaminoethanol (IPAE) was used, and ammonia, ethylamine, or isopropylamine was respectively detected as the corresponding decomposition product of the alkanolamine to evaluate oxidation stability.

Specifically, the outlet gas of the absorption column 7 was fractionated by 1 L/min and was allowed to pass through an absorption bottle containing 100 mL of 0.01 N HCl for 1 hour. Subsequently, the con concentration of the decomposition product in the solution was measured by ion chromatography to determine the scattering amount of the oxidative decomposition product of the alkanolamine per recovery volume of $CO_2$. As described below, the scattering amount in each example is shown as a relative value when the scattering amount in the corresponding comparative example is defined as 1.

The scattering amount used as the basis of the $CO_2$ gas recovery volume was calculated by the following method.
(1) The $CO_2$ gas recovery volume (m³/h) is calculated from measured $CO_2$ concentrations C1 and C2 in inlet gas and outlet gas, respectively, provided that a change in volume between the inlet gas and the outlet gas is the $CO_2$ gas recovery volume.

$$CO_2 \text{ recovery volume } (m^3/h)=[2(m^3/h)\times(C1-C2)]/(1-C2) \quad \text{[Formula 2]}$$

Furthermore, the unit of the $CO_2$ gas recovery volume is converted to kg/h by multiplying the resulting value by 1000 $(L/m^3)/22.4$ (L/mol)×44 (g/mol)/1000 (kg/g).

(2) The outlet gas volume is fractionated by 60 L, and on this occasion, the suction gas volume is measured with a dry gas meter (model: DC-1, manufactured by Shinagawa Corp.).

(3) The concentrations of ammonium and specific decomposition amine (none in the case of MEA, methylamirie in the case of MAE, ethylamine in the case of EMEA, and isopropylamine in the case of IPAE) in the absorption bottle through which the suction gas passed are measured by ion chromatography (model: DX-100, manufactured by Dionex Corp.). The total number of moles is used as the decomposition product concentration, and the total decomposition product amount (per 60 L of gas) is calculated from 100 mL of the absorbing solution.

(4) The decomposition product amount in (3) is converted into the amount per total exhaust gas volume (2 $m^3$-$CO_2$ recovery volume) discharged from the absorption column. This amount is defined as scattering amount in each Example and Comparative Example.

(5) The scattering amount as the $CO_2$ recovery amount standard is calculated by dividing the scattering amount per total exhaust gas by the $CO_2$ recovery amount (kg/h) of each Example and Comparative Example.

EXAMPLES

Example 1

An experiment for absorption and recovery of $CO_2$ from exhaust gas was performed in the apparatus shown in FIG. 1 using a $CO_2$ absorbing solution which is 45% by weight in concentration of 2-ethylaminoethanol, 0.1% by weight in concentration of 2-mercaptobenzimidazole as an organosulfur compound, and 5 ppm (mg/kg) in concentration of VC604 manufactured by Shin-Etsu Chemical Co., Ltd. as a silicone oil under conditions described above.

Example 2

An experiment was performed under the same conditions as in Example 1 except that the concentration of 2-mercaptobenzimidazole was 0.01% by weight.

Example 3

An experiment was performed under the same conditions as in Example 1 except that the concentration of 2-mercaptobenzimidazole was 2.0% by weight.

Example 4

An experiment was performed under the same conditions as in Example 1 except that the concentration of the silicone oil was 50 ppm (mg/kg).

Example 5

An experiment was performed under the same conditions as in Example 1 except that the concentration of the silicone oil was 100 ppm (mg/kg).

Example 6

An experiment was performed under the same conditions as in Example 1 except that the concentration of 2-ethylaminoethanol was 30% by weigh.

Example 7

An experiment was performed under the same conditions as in Example 1 except that the concentration of 2-ethylaminoethanol was 60% by weight.

Example 8

An experiment was performed under the same conditions as in Example 1 except that 0.1% by weight of 2-mercapto-1-methylimidazole was used as the organosulfur compound.

Example 9

An experiment was performed under the same conditions as in Example 1 except that 0.01% by weight of 2-mercapto-1-methylimidazole was used as the organosulfur compound.

Example 10

An experiment was performed under the same conditions as in Example 1 except that 2.0% by weight of 2-mercapto-1-methylimidazole was used as the organosulfur compound.

Example 11

An experiment was performed under the same conditions as in Example 1 except that 0.1% by weight of 2-mercapto-5-methylbenzimidazole was used as the organosulfur compound.

Example 12

An experiment was performed under the same conditions as in Example 1 except that 0.01% by weight of 2-mercapto-5-methylbenzimidazole was used as the organosulfur compound.

Example 13

An experiment was performed under the same conditions as in Example 1 except that 2.0% by weight of 2-mercapto-5-methylbenzimidazole was used as the organosulfur compound.

Example 14

An experiment was performed under the same conditions as in Example 1 except that 30% by weight of 2-aminoethanol was used as the alkanolamine.

Example 15

An experiment was performed under the same conditions as in Example 2 except that 30% by weight of 2-aminoethanol was used as the alkanolamine.

Example 16

An experiment was performed under the same conditions as in Example 3 except that 30% by weight of 2-aminoethanol was used as the alkanolamine.

Example 17

An experiment was performed under the same conditions as in Example 1 except that 52% by weight of 2-isopropylaminoethanol was used as the alkanolamine.

Example 18

An experiment was performed under the same conditions as in Example 2 except that 52% by weight of 2-isopropylaminoethanol was used as the alkanolamine.

Example 19

An experiment was performed under the same conditions as in Example 3 except that 52% by weight of 2-isopropylaminoethanol was used as the alkanolamine.

Example 20

An experiment was performed under the same conditions as in Example 1 except that 22.5% by weight of 2-ethylaminoethanol and 26% by weight of 2-isopropylaminoethanol were used as the alkanolamines.

Example 21

An experiment was performed under the same conditions as in Example 2 except that 22.5% by weight of 2-ethylaminoethanol and 26% by weight of 2-isopropylaminoethanol were used as the alkanolamines.

Example 22

An experiment was performed under the same conditions as in Example 3 except that 22.5% by weight of 2-ethylaminoethanol and 26% by weight of 2-isopropylaminoethanol were used as the alkanolamines.

Example 23

An experiment was performed under the same conditions as in Example 1 except that 22.5% by weight of 2-ethylaminoethanol and 15% by weight of 2-aminoethanol were used as the alkanolamines.

Example 24

An experiment was performed under the same conditions as in Example 2 except that 22.5% by weight of 2-ethylaminoethanol and 15% by weight of 2-aminoethanol were used as the alkanolamines.

Example 25

An experiment was performed under the same conditions as in Example 3 except that 22.5% by weight of 2-ethylaminoethanol and 15% by weight of 2-aminoethanol were used as the alkanolamines.

Example 26

An experiment was performed under the same conditions as in Example 1 except that 15% by weight of 2-aminoethanol and 26% by weight of 2-isopropylaminoethanol were used as the alkanolamines.

Example 27

An experiment was performed under the same conditions as in Example 2 except that 15% by weight of 2-aminoethanol and 26% by weight of 2-isopropylaminoethanol were used as the alkanolamines.

Example 28

An experiment was performed under the same conditions as in Example 3 except that 15% by weight of 2-aminoethanol and 26% by weight of 2-isopropylaminoethanol were used as the alkanolamines.

Example 29

An experiment was performed under the same conditions as in Example 1 except that KS537 manufactured by Shin-Etsu Chemical Co., Ltd. was used as the silicone oil.

Example 30

An experiment was performed under the same conditions as in Example 1 except that KS538 manufactured by Shin-Etsu Chemical Co., Ltd. was used as the silicone oil.

Example 31

An experiment was performed under the same conditions as in Example 1 except that FS544 manufactured by Dow Corning Toray Co., Ltd. was used as the silicone oil.

Comparative Example 1

An experiment was performed under the same conditions as in Example 1 except that the silicone oil was not used.

Comparative Example 2

An experiment was performed under the same conditions as in Example 1 except that the organosulfur compound and the silicone oil were not used.

Comparative Example 3

An experiment was performed under the same conditions as in Example 1 except that 2-mercaptobenzimidazole was not used.

Comparative Example 4

An experiment was performed under the same conditions as in Example 1 except that the concentration of the silicone oil was 200 ppm (mg/kg).

Comparative Example 5

An experiment was performed under the same conditions as in Example 2 except that the silicone oil was not used.

Comparative Example 6

An experiment was performed under the same conditions as in Example 3 except that the silicone oil was not used.

Comparative Examples 7 to 29

Experiments were performed under the same conditions as in Examples 6 to 28, respectively, except that the silicone oil was not used.

Comparative Example 30

An experiment was performed under the same conditions as in Example 1 except that the absorbing solution contains 100 ppm of polypropylene glycol (trade name: PPG-700, manufactured by Nippon Yuka Kogyo Co., Ltd.), which is an organic surfactant, instead of the silicone oil.

Example 32

As a simulation where the silicone oil was degraded and ineffective, an aqueous solution containing KS604 manufactured by Shin-Etsu Chemical Co., Ltd. diluted ten-fold was supplied as a silicone oil to the absorbing solution passed through the amine cooler 5 of the apparatus shown in FIG. 1 while operating the apparatus under the same conditions as in Comparative Example 1. On this occasion, the flow rate was controlled with a micropump so that the concentration of the silicone oil in the absorbing solution circulating in the absorption column 7 was 5 ppm.

Example 33

As a simulation where the organosulfur compound was oxidized and ineffective, an absorbing solution containing 1% by weight of mercaptobenzimidazole, 45% by weight of 2-ethylaminoethanol, and 5 ppm of KS604 manufactured by Shin-Etsu Chemical Co., Ltd. was supplied to an absorbing solution passed through the amine cooler 5 of the apparatus shown in FIG. 1 at a flow rate of 10% of that of the absorbing solution passed through the amine cooler 5 while operating the apparatus under the same conditions as in Comparative Example 3. On this occasion, the circulation amount of the absorbing solution was controlled so that the liquid-gas ratio was 3.0.

Tables 1 to 3 show the conditions of Examples and Comparative Examples and the evaluation results, respectively. In the evaluation results, the scattering amount of oxidative decomposition product of an alkanolamine per $CO_2$ recovery amount was determined from analysis of the decomposition products in the exhaust gas from the absorption column and the recovered gas from the regeneration column, and the scattering amount of each Example is shown as a relative value when the scattering amount in the corresponding Comparative Example is defined as 1. In Table 3, "Excellent" means that the scattering amount of the oxidative decomposition product decreased to a level of less than 0.5 times that of the corresponding Comparative Example; "Good" means that the scattering amount decreased to a level of 0.5 times or more and less than 0.7 times that of the corresponding Comparative Example; and "Fair" means that the scattering amount decreased to a level of 0.7 times or more and less than 0.9 times that of the corresponding Comparative Example.

In comparison of the results of Example 1 and Comparative Example 2 shown in Table 3, it is recognized that though oxidation of the alkanolamine is obviously inhibited by addition of the organosulfur compound, the oxidation of the alkanolamine is obviously further inhibited by addition of the silicone oil. It is also recognized from the results of Comparative Example 4 that an excessive amount of silicone oil is ineffective. In comparison of $CO_2$ recovery rations at the same liquid-gas ratio of 3 in Comparative Example 4 and Example 1, the values in Comparative Example 4 are constantly lower than those in Example 1. That is, as described above, it is presumed that the silicone oil covers the surface of the absorbing solution, resulting in inhibition of the $CO_2$ absorption reaction. The organic surfactant used in Comparative Example 30 does not have an effect at the same concentration as that of the silicone oil.

In comparison of the results of Example 32 and Example 1, the oxide amounts are the same, and thus the method according to Claim 3 can provide a similar effect.

The amount of the oxide in the method according to Example 33 is equivalent to that in Example 1. Thus, it is shown that the method according to Claim 5 can provide a similar effect.

TABLE 1

| Ex. | Material Alkanolamine | Organosulfur compound | Silicone oil | Conc. [wt %] Alkanolamine | Organosulfur compound | Conc. [ppm] Silicone oil |
|---|---|---|---|---|---|---|
| 1 | EMEA | 2-MBI | KS604 | 45 | 0.1 | 5 |
| 2 | EMEA | 2-MBI | KS604 | 45 | 0.01 | 5 |
| 3 | EMEA | 2-MBI | KS604 | 45 | 2 | 5 |
| 4 | EMEA | 2-MBI | KS604 | 45 | 0.1 | 50 |
| 5 | EMEA | 2-MBI | KS604 | 45 | 0.1 | 100 |
| 6 | EMEA | 2-MBI | KS604 | 35 | 0.1 | 5 |
| 7 | EMEA | 2-MBI | KS604 | 60 | 0.1 | 5 |
| 8 | EMEA | 2-M-1-MI | KS604 | 45 | 0.1 | 5 |
| 9 | EMEA | 2-M-1-MI | KS604 | 45 | 0.01 | 5 |
| 10 | EMEA | 2-M-1-MI | KS604 | 45 | 2 | 5 |
| 11 | EMEA | 2-M-5-MBI | KS604 | 45 | 0.1 | 5 |
| 12 | EMEA | 2-M-5-MBI | KS604 | 45 | 0.01 | 5 |
| 13 | EMEA | 2-M-5-MBI | KS604 | 45 | 2 | 5 |
| 14 | MEA | 2-MBI | KS604 | 30 | 0.1 | 5 |
| 15 | MEA | 2-MBI | KS604 | 30 | 0.01 | 5 |
| 16 | MEA | 2-MBI | KS604 | 30 | 2 | 5 |
| 17 | IPAE | 2-MBI | KS604 | 52 | 0.1 | 5 |
| 18 | IPAE | 2-MBI | KS604 | 52 | 0.01 | 5 |
| 19 | IPAE | 2-MBI | KS604 | 52 | 2 | 5 |
| 20 | EMEA + IPAE | 2-MBI | KS604 | 22.5% + 26% | 0.1 | 5 |
| 21 | EMEA + IPAE | 2-MBI | KS604 | 22.5% + 26% | 0.01 | 5 |
| 22 | EMEA + IPAE | 2-MBI | KS604 | 22.5% + 26% | 2 | 5 |
| 23 | MEA + EMEA | 2-MBI | KS604 | 15% + 22.5% | 0.1 | 5 |
| 24 | MEA + EMEA | 2-MBI | KS604 | 15% + 22.5% | 0.01 | 5 |
| 25 | MEA + EMEA | 2-MBI | KS604 | 15% + 22.5% | 2 | 5 |
| 26 | MEA + IPAE | 2-MBI | KS604 | 15% + 26% | 0.1 | 5 |
| 27 | MEA + IPAE | 2-MBI | KS604 | 15% + 26% | 0.01 | 5 |
| 28 | MEA + IPAE | 2-MBI | KS604 | 15% + 26% | 2 | 5 |
| 29 | EMEA | 2-MBI | KS537 | 45 | 0.1 | 5 |
| 30 | EMEA | 2-MBI | KS538 | 45 | 0.1 | 5 |
| 31 | EMEA | 2-MBI | FS544 | 45 | 0.1 | 5 |

TABLE 2

| Ex. | Material Alkanolamine | Organosulfur compound | Silicone oil | Conc. [wt %] Alkanolamine | Organosulfur compound | Conc. [ppm] Silicone oil |
|---|---|---|---|---|---|---|
| 1 | EMEA | 2-MBI | None | 45 | 0.1 | 0 |
| 2 | EMEA | None | None | 45 | 0 | 0 |
| 3 | EMEA | None | KS604 | 45 | 0 | 5 |
| 4 | EMEA | 2-MBI | KS604 | 45 | 0.1 | 200 |
| 5 | EMEA | 2-MBI | None | 45 | 0.01 | 0 |
| 6 | EMEA | 2-MBI | None | 45 | 2 | 0 |
| 7 | EMEA | 2-MBI | None | 30 | 0.1 | 0 |
| 8 | EMEA | 2-MBI | None | 60 | 0.1 | 0 |
| 9 | EMEA | 2-M-1-MI | None | 45 | 0.1 | 0 |
| 10 | EMEA | 2-M-1-MI | None | 45 | 0.01 | 0 |
| 11 | EMEA | 2-M-1-MI | None | 45 | 2 | 0 |
| 12 | EMEA | 2-M-5-MBI | None | 45 | 0.1 | 0 |
| 13 | EMEA | 2-M-5-MBI | None | 45 | 0.01 | 0 |
| 14 | EMEA | 2-M-5-MBI | None | 45 | 2 | 0 |
| 15 | MEA | 2-MBI | None | 30 | 0.1 | 0 |
| 16 | MEA | 2-MBI | None | 30 | 0.01 | 0 |
| 17 | MEA | 2-MBI | None | 30 | 2 | 0 |
| 18 | IPAE | 2-MBI | None | 52 | 0.1 | 0 |
| 19 | IPAE | 2-MBI | None | 52 | 0.01 | 0 |
| 20 | IPAE | 2-MBI | None | 52 | 2 | 0 |
| 21 | EMEA + IPAE | 2-MBI | None | 22.5% + 26% | 0.1 | 0 |
| 22 | EMEA + IPAE | 2-MBI | None | 22.5% + 26% | 0.01 | 0 |
| 23 | EMEA + IPAE | 2-MBI | None | 22.5% + 26% | 2 | 0 |
| 24 | MEA + EMEA | 2-MBI | None | 15% + 22.5% | 0.1 | 0 |
| 25 | MEA + EMEA | 2-MBI | None | 15% + 22.5% | 0.01 | 0 |
| 26 | MEA + EMEA | 2-MBI | None | 15% + 22.5% | 2 | 0 |
| 27 | MEA + IPAE | 2-MBI | None | 15% + 26% | 0.1 | 0 |
| 28 | MEA + IPAE | 2-MBI | None | 15% + 26% | 0.01 | 0 |
| 29 | MEA + IPAE | 2-MBI | None | 15% + 26% | 2 | 0 |
| 30 | EMEA | 2-MBI | KS604 | 45 | 0.1 | 0 |

TABLE 3

| Ex. | Corresponding Comp. Ex. | Items compared | Scattering amount of oxidative decomposition product of amine per unit CO2 recovery amount (defining the amount of corresponding Comparative Example as 1) |
|---|---|---|---|
| 1 | 1 | With or without silicone oil | Good (0.5 to 0.7) |
| 2 | 5 | | Good |
| 3 | 6 | | Good |
| 1 | 4 | Excessive silicone | Fair (0.7 to 0.9) |
| 1 | 2 | With or without organosulfur compound and silicone oil | Excellent (less than 0.5) |
| 1 | 3 | With or without organosulfur compound | Excellent |
| 6 | 7 | With or without silicone oil | Good |
| 7 | 8 | | Good |
| 8 | 9 | | Good |
| 9 | 10 | | Good |
| 10 | 11 | | Good |
| 11 | 12 | | Good |
| 12 | 13 | | Good |
| 13 | 14 | | Good |
| 14 | 15 | | Good |
| 15 | 16 | | Good |
| 16 | 17 | | Good |
| 17 | 18 | | Good |
| 18 | 19 | | Good |
| 19 | 20 | | Good |
| 20 | 21 | | Good |
| 21 | 22 | | Good |
| 22 | 23 | | Good |
| 23 | 24 | | Good |
| 24 | 25 | | Good |
| 25 | 26 | | Good |
| 26 | 27 | | Good |
| 27 | 28 | | Good |
| 28 | 29 | | Good |
| 1 | 30 | Comparison of silicone oil and organic surfactant | Good |
| 29 | 1 | Type of silicone oil | Good |
| 30 | 1 | | Good |
| 31 | 1 | | Good |
| 32 | 1 | Method of supplying silicone oil | the same quantity (1) |
| 33 | 1 | Methods of supplying silicone oil and organosulfur compound | the same quantity (1) |

Fair: 0.7 times or more and less than 0.9 times the corresponding Comparative Example
Good: 0.5 times or more and less than 0.7 times the corresponding Comparative Example
Excellent: less than 0.5 times the corresponding Comparative Example

The invention claimed is:

1. A carbon dioxide-absorbing solution capable of absorbing carbon dioxide from gas to be processed containing carbon dioxide and oxygen and releasing carbon dioxide, wherein the absorbing solution is an aqueous solution containing an alkanolamine represented by $C_nH_{2n+1}NHC_nH_{2n'+1}O$, wherein n represents an integer of 0 to 4 and n' represents an integer of 1 to 3;

one or more organosulfur compounds selected from the group consisting of mercaptoimidazoles represented by the following Formula (A) and mercaptobenzimidazoles represented by the following Formula (B); and a silicone oil, wherein the aqueous solution contains the alkanolamine in an amount of 30% by weight or more and 60% by weight or less, the organosulfur compounds in an amount of 0.01% by weight or more and 2% by weight or less, and the silicone oil in an amount of 5 ppm by weight or more and 100 ppm by weight or less,

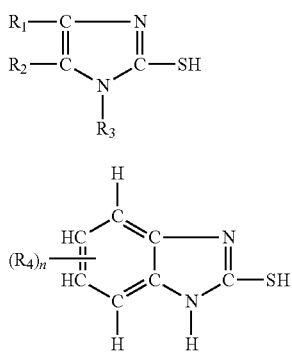

in the formulae, $R_1$, $R_2$, and $R_3$ represent hydrogen atoms, $C_1$ to $C_3$ alkyl groups, phenyl groups, or benzyl groups; $R_4$ represents a hydrogen atom or a $C_1$ to $C_3$ alkyl group; and n represents an integer of 1 to 3.

2. The carbon dioxide-absorbing solution according to claim 1, wherein the alkanolamine is one or more compounds selected from the group consisting of 2-aminoethanol, 2-(methylamino)ethanol, 2-(ethylamino)ethanol, 2-amino-2-methyl-1-propanol, and 2-(isopropylamino)ethanol.

3. A method of recovering carbon dioxide, wherein the method comprises:
bringing gas to be processed containing carbon dioxide ($CO_2$) and oxygen into contact with a $CO_2$-absorbing solution according to claim 1 in an absorption column to form a $CO_2$-rich solution;
subsequently circulating the solution in a regeneration column to thermally release and recover $CO_2$ and recirculating the absorbing solution as a $CO_2$-poor solution inside the absorption column; and
performing heat exchange between the solution being delivered from the absorption column to the regeneration column and the solution recirculated from the regeneration column to the absorption column,
wherein an alkanolamine aqueous solution containing a silicone oil and/or an organosulfur compound represented by the Formula (A) or (B) is added to the solution inside the absorption column and/or the solution recirculated from the regeneration column to the absorption column to adjust the composition of the absorbing solution inside the absorption column so as to include the alkanolamine in an amount of 30% by weight or more and 60% by weight or less, the organosulfur compound in an amount of 0.01% by weight or more and 2% by weight or less, and the silicone oil in an amount of 5 ppm by weight or more and 100 ppm by weight or less.

4. The method of recovering carbon dioxide according to claim 3, wherein the alkanolamine is one or more compounds selected from the group consisting of 2-aminoethanol, 2-(methylamino)ethanol, 2-(ethylamino)ethanol, 2-amino-2-methyl-1-propanol, and 2-(isopropylamino)ethanol.

5. The method of recovering carbon dioxide according to claim 3, wherein the alkanolamine aqueous solution containing the organosulfur compound represented by the Formula (A) or (B) has an alkanolamine concentration higher than that in the absorbing solution and an organosulfur compound concentration higher than that in the absorbing solution.

6. The method of recovering carbon dioxide according to claim 4, wherein the alkanolamine aqueous solution containing the organosulfur compound represented by the Formula (A) or (B) has an alkanolamine concentration higher than that in the absorbing solution and an organosulfur compound concentration higher than that in the absorbing solution.

* * * * *